(12) United States Patent
Chambron et al.

(10) Patent No.: US 9,739,485 B2
(45) Date of Patent: Aug. 22, 2017

(54) METHOD AND UNIT FOR REMOVING CARBON MONOXIDE FROM A GAS FLOW COMPRISING $CO_2$ AND RECOVERING ENERGY FROM A FLOW LEAVING SAID UNIT

(71) Applicant: L'Air Liquide,Societe Anonyme pour l'Etude et l'Exploitation des Procedes Georges Claude, Paris (FR)

(72) Inventors: Nicolas Chambron, Nogent sur Marne (FR); Arthur Darde, Paris (FR); Richard Dubettier-Grenier, La Varenne Saint Hilaire (FR); Mathieu Leclerc, Paris (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 17 days.

(21) Appl. No.: 14/438,319

(22) PCT Filed: Sep. 25, 2013

(86) PCT No.: PCT/FR2013/052250
§ 371 (c)(1),
(2) Date: Apr. 24, 2015

(87) PCT Pub. No.: WO2014/064352
PCT Pub. Date: May 1, 2014

(65) Prior Publication Data
US 2015/0285493 A1 Oct. 8, 2015

(30) Foreign Application Priority Data
Oct. 25, 2012 (FR) ...................... 12 60184

(51) Int. Cl.
*F23G 7/07* (2006.01)
*B01D 53/00* (2006.01)
(Continued)

(52) U.S. Cl.
CPC ............. *F23G 7/07* (2013.01); *B01D 53/002* (2013.01); *B01D 53/864* (2013.01);
(Continued)

(58) Field of Classification Search
None
See application file for complete search history.

(56) References Cited

U.S. PATENT DOCUMENTS 4,710,213 A * 12/1987 Sapper ................. C07C 7/04
62/631
8,012,446 B1 9/2011 Wright et al.
(Continued)

FOREIGN PATENT DOCUMENTS

EP 2 404 656 1/2012
EP 2 455 336 5/2012

OTHER PUBLICATIONS

International Search Report and Written Opinion for PCT/FR2013/052250, mailed Jan. 27, 2014.
(Continued)

*Primary Examiner* — Melvin C Mayes
*Assistant Examiner* — Sheng H Davis
(74) *Attorney, Agent, or Firm* — Justin K. Murray

(57) ABSTRACT

The invention relates to a unit for the purification of a gas flow comprising CO and at least 45% CO2 and a method of operating said unit. In one embodiment, said unit contains a first compressor, a heat exchanger configured to cool the compressed gas flow, a separation chamber configured to separate head gas produced in the heat exchanger, a heater disposed on the line of the head gas originating from the (Continued)

separation chamber, a catalytic oxidation unit for oxidizing the compressed CO in the gas flow originating from the heater, and turbines placed downstream of the catalytic oxidation unit.

8 Claims, 1 Drawing Sheet

(51) Int. Cl.
    *B01D 53/86*     (2006.01)
    *B01D 53/22*     (2006.01)
    *B01D 53/26*     (2006.01)

(52) U.S. Cl.
    CPC .......... *B01D 53/229* (2013.01); *B01D 53/265* (2013.01); *B01D 2255/1021* (2013.01); *B01D 2255/1023* (2013.01); *B01D 2255/2092* (2013.01); *B01D 2256/22* (2013.01); *B01D 2257/502* (2013.01); *B01D 2257/504* (2013.01); *B01D 2257/80* (2013.01); *B01D 2258/0283* (2013.01); *F23J 2215/40* (2013.01); *F23J 2219/70* (2013.01)

(56) References Cited

U.S. PATENT DOCUMENTS

| | | | |
|---|---|---|---|
| 2006/0143980 A1* | 7/2006 | Rapier | B01J 8/025 48/61 |
| 2008/0141672 A1 | 6/2008 | Shah et al. | |
| 2010/0024476 A1 | 2/2010 | Shah | |
| 2011/0253551 A1* | 10/2011 | Lane | B01D 53/326 205/555 |
| 2012/0009109 A1* | 1/2012 | Wright | B01D 53/75 423/239.1 |

OTHER PUBLICATIONS

French Search Report and Written Opinion for FR1260184, mailed Jul. 17, 2013.

* cited by examiner

METHOD AND UNIT FOR REMOVING CARBON MONOXIDE FROM A GAS FLOW COMPRISING $CO_2$ AND RECOVERING ENERGY FROM A FLOW LEAVING SAID UNIT

CROSS REFERENCE TO RELATED APPLICATIONS

This application is a §371 of International PCT Application PCT/FR2013/052250, filed Sep. 25, 2013, which claims the benefit of FR1260184, filed Oct. 25, 2012, both of which are herein incorporated by reference in their entireties.

TECHNICAL FIELD OF THE INVENTION

The present invention relates to a plant and a process for removing CO from a gas stream comprising at least 45% carbon dioxide, more particularly more than 80% carbon dioxide. The invention applies particularly to the purification of a gas stream resulting from an oxy-fuel combustion process.

BACKGROUND

The increase in the concentration of carbon dioxide in the atmosphere is to a very great extent the cause of global warming $CO_2$ of human origin is essentially emitted into the atmosphere by the combustion of fossil fuels in thermal power stations.

Thermal power stations, by combustion of fuels, make it possible to release heat that can be used to produce steam and optionally mechanical or electrical energy. The combustion flue gases release large amounts of $CO_2$ into the atmosphere. In addition to $CO_2$, other molecules are emitted into the atmosphere and are polluting, such as nitrogen oxides (NOx), sulfur oxides (SOx) and carbon monoxide (CO).

Reducing the carbon monoxide emissions is crucial considering in particular the limit thresholds imposed. Today, only an adaptation of the process conditions, in the sense of reducing the generation of carbon monoxide in the combustion chamber, makes it possible to reduce the carbon monoxide emissions. To do this, the excess of oxidant ($O_2$ from the air in particular) could be increased so that the oxidation of the coal or natural gas is maximized, thus oxidizing the carbon monoxide to carbon dioxide. But this reduction is not sufficient.

The carbon monoxide emission thresholds reached with this technique still remain very high.

SUMMARY OF THE INVENTION

Starting from here, one problem that is faced is to provide a plant that makes it possible to improve the purification of a feed gas stream comprising at least 45% $CO_2$ in order to reduce the atmospheric emissions of carbon monoxide.

One solution of the present invention is a plant for purifying a gas stream comprising at least 45% $CO_2$, and CO, said plant comprising:
 (i) a first compressor for compressing the gas stream,
 (ii) a heat exchanger for cooling the compressed gas stream,
 (iii) a separator pot for separating the overhead gas produced in the heat exchanger,
 (iv) a heater 2 placed in the line of the overhead gas resulting from the separator pot,
 (v) a catalytic oxidation unit 3 for oxidizing the compressed CO in the gas stream resulting from the heater 2, and
 (vi) turbines 5 placed downstream of the catalytic oxidation unit.

Let it be noted that the heater placed in the line of the overhead gas resulting from the separator pot upstream of the catalytic oxidation unit makes it possible to heat the gas stream to a temperature of between 90° C. and 140° C. Indeed, the catalytic oxidation must be carried out hot, in other words at a temperature of between 90° C. and 200° C.

According to a second alternative and in order to obtain a better efficiency in terms of $CO_2$ recovery rate, the plant may comprise:
 (i) a first compressor for compressing the gas stream,
 (ii) a heat exchanger for cooling the compressed gas stream,
 (iii) a first separator pot for separating the overhead gas produced in the heat exchanger,
 (iv) a second separator pot placed in the line of the overhead gas resulting from the first separator pot,
 (v) a second compressor placed in the line of the overhead gas resulting from the first separator pot, between the first and second separator pots,
 (vi) a heater 2 placed in the line of the overhead gas resulting from the second separator pot,
 (vii) a catalytic oxidation unit 3 for oxidizing the compressed CO in the gas stream resulting from the heater, and
 (viii) turbines 5 placed downstream of the second catalytic oxidation unit.

This second plant makes it possible to improve the $CO_2$ recovery efficiency. Another improvement would consist in installing the catalytic oxidation unit between the first and second separator pots, preferably between the second compressor and the second separator pot. Indeed, placing a catalytic oxidation unit downstream of the second compressor and upstream of the second separator pot above all makes it possible to increase the $CO_2$ recovery efficiency by the order of 0.1% for around 700 ppm of carbon monoxide in the incoming flue gases.

The expression "catalytic oxidation unit" is understood to mean a unit comprising a catalyst for catalyzing the reaction and an oxidant necessary for the oxidation. Within the context of the invention, the catalyst is preferably an aluminum matrix activated with platinum and/or palladium and the oxidant is oxygen.

The catalytic oxidation unit 3 makes it possible to oxidize the CO to $CO_2$ and therefore to generate a greater portion of $CO_2$.

The turbines 5 themselves make it possible to recover a portion of the energy linked to the high pressure and to the temperature of the gas at the outlet of the catalytic oxidation unit.

Depending on the case, the plant according to the invention may comprise one or more of the following features:
 said plant comprises a membrane separation unit 7 for recovering the $CO_2$ produced by the catalytic oxidation unit 3 and the separator pot(s), and the turbines 5 are placed in the line of the residual gas 9 resulting from the membrane separation unit 7;
 said plant comprises a heat exchanger 6 that makes it possible to use the heat at the outlet of the catalytic oxidation unit 3 to preheat the gas stream entering the catalytic oxidation unit 3 and thus to cool the gas stream leaving the catalytic oxidation unit 3. Indeed, it is preferable to cool the gas stream leaving the catalytic oxidation unit and therefore brought in contact with the membrane 7 since the membrane operates best at ambient temperature, or even at temperatures between 25° C. and −50° C.;

said plant comprises a heater 10 between the membrane and the turbines. Indeed, the turbines 5 require heating to a temperature between 50° C. and 200° C. before expanding;

said plant comprises a heat exchanger 6 that makes it possible to use the heat at the outlet of the catalytic oxidation unit 3 to heat the residual gas 9 resulting from the membrane 7 and thus to cool the gas stream leaving the catalytic oxidation unit 3. In this case, the heat exchanger 6 makes it possible to do without the heater 10 before the turbines;

said plant comprises a coolant 4 placed between the heat exchanger and the membrane separation unit 7.

The membrane separation unit 7 makes it possible to recover $CO_2$. Therefore, placing the catalytic oxidation unit upstream of the membrane separation unit 7 makes it possible to recover the $CO_2$ generated by the catalytic oxidation unit.

Another subject of the present invention is a process for purifying a feed gas stream comprising at least 45% $CO_2$, and CO, said process using a plant as defined in one of claims 1 to 7 and comprising:

a) a step of separating the feed gas stream in at least one separator pot, b) a step of heating the overhead gas resulting from the separator pot within the heater 2, c) a step 3 of catalytic oxidation of the gas stream heated in step b) in the presence of oxygen, d) a step of recovering the energy linked to the pressure and to the temperature of the gas stream recovered downstream of the catalytic oxidation unit by means of turbines 5.

Let it be noted that within the turbines 5, the gas is expanded from a pressure between 5 and 50 bar to a pressure between atmospheric pressure and 4 bar.

Depending on the case, the process according to the invention may have one or more of the following features:

that said process comprises, between the steps c) and d), a step of recovering the $CO_2$ produced in the catalytic oxidation step c) by means of a membrane separation unit 7;

the feed gas stream comprises oxygen and this oxygen is used in the catalytic oxidation step c);

the concentration of CO in said feed gas stream is less than 1%, preferably less than 0.1%;

the concentration of $CO_2$ in said feed gas stream is greater than 45%, preferably greater than 70%;

the catalytic oxidation step c) is carried out at a pressure of between 5 and 50 bar;

the feed gas stream is a stream of oxy-fuel combustion flue gases.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figure 1:
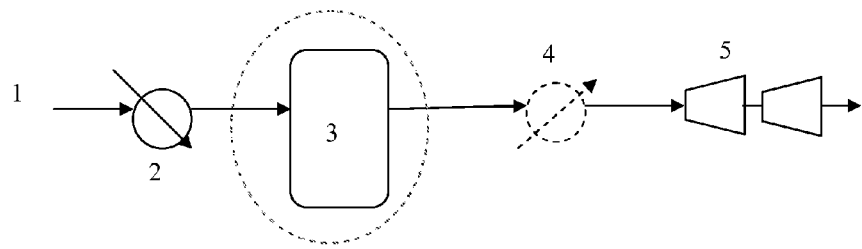
FIG. 1 shows an embodiment of the invention.

The invention will now be described in detail with the aid of FIGS. 1 to 3.

Let it be noted that in each the figures, the separator pot or pots are not represented. The gas stream 1 will be considered to be the stream leaving the separator pot or pots. FIG. 1 represents the simplest version of a plant according to the invention. Indeed, this plant comprises neither a membrane that makes it possible to recover the $CO_2$ generated by the last catalytic oxidation, nor a heat exchanger. The gas stream 1 leaving the separator pot or pots is heated to a temperature of between 90° C. and 140° C. in a heater 2, then is introduced into the catalytic oxidation unit 3 between 5 and 50 bar. The oxidant used in this catalytic oxidation unit 3 is the oxygen initially included in the feed gas stream and/or oxygen originating from an outside source. This catalytic oxidation unit 3 makes it possible to obtain a CO concentration of the order of 100 ppm. Thus recovered at the outlet of the catalytic oxidation unit is a gas stream that is depleted in CO and slightly enriched in $CO_2$, at a pressure between 5 and 50 bar. This $CO_2$-enriched stream is then cooled in a coolant 4 to a temperature of between 50° C. and 200° C. before being sent to the turbines 5 in order to recover the pressure energy from the gas stream. The energy recovered will depend on the degree of expansion in the turbine(s), on the inlet temperature and on the efficiency of the turbines. The temperature at the outlet is between −60° C. and 100° C.

Figure 2:
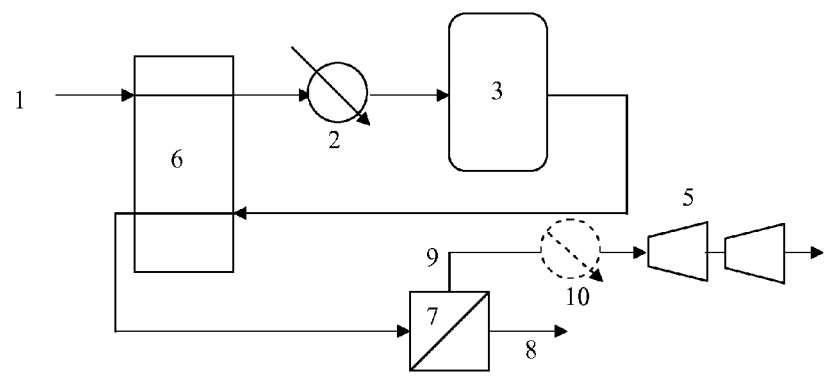
FIG. 2 shows an embodiment of the invention.

FIG. 2 represents the version of a plant according to the invention comprising a heat exchanger 6 that makes it possible to use the heat at the outlet of the catalytic oxidation unit to preheat the gas stream entering the catalytic oxidation unit and thus to cool the gas stream leaving the catalytic oxidation unit. The gas stream 1 leaving the separator pot or pots is heated to a temperature of between 90° C. and 140° C. partly by means of the heat exchanger 6 and partly by means of a heater 2. Since the catalytic reaction is exothermic, a portion of the heat will be generated by the catalytic oxidation unit. If the CO content is high, this production of heat may be sufficient to be able to avoid the use of the heater 2. The gas stream is then introduced into the catalytic oxidation unit 3 between 5 and 50 bar. The oxidant used in this catalytic oxidation unit 3 is the oxygen initially included in the feed gas stream and/or oxygen originating from an outside source. This catalytic oxidation unit 3 makes it possible to obtain a CO concentration of the order of 100 ppm. Thus recovered at the outlet of the catalytic oxidation unit is a gas stream that is depleted in CO and slightly enriched in $CO_2$, at a pressure between 5 and 50 bar. This $CO_2$-enriched stream is then cooled by virtue of the heat exchanger 6 to a temperature of between −50° C. and 25° C. Indeed, a portion of the heat from the outgoing stream makes it possible to heat, by means of the heat exchanger 6, the stream entering the catalytic oxidation unit. This operation makes it possible in fact, by means of the heat exchanger 6, to simultaneously cool the gas stream leaving the catalytic oxidation unit. The stream thus cooled is brought into contact with the membrane 7 which will make it possible to recover the $CO_2$ generated by the catalytic oxidation unit 3. Indeed, recovered at the outlet of the membrane 7 are a $CO_2$-enriched gas stream 8 and a residual gas stream 9 at a pressure of between 5 and 50 bar. This residual stream 9 is then heated in a heater 10 to a temperature of between 50° C. and 200° C. before being sent to the turbines 5 in order to recover the pressure energy from the gas stream.

Figure 3:
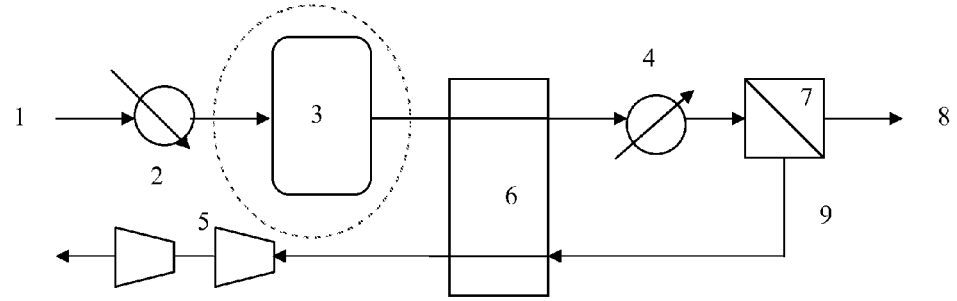
FIG. 3 shows an embodiment of the invention.

FIG. 3 represents the version of a plant according to the invention comprising a heat exchanger 6 that makes it possible to use the heat at the outlet of the catalytic oxidation unit to heat the residual gas resulting from the membrane and thus to cool the gas stream leaving the catalytic oxidation unit. The gas stream 1 leaving the separator pot or pots is heated to a temperature of between 90° C. and 140° C. in a heater 2 then is introduced into the catalytic oxidation unit 3 between 5 and 50 bar. The oxidant used in this catalytic oxidation unit 3 is the oxygen initially included in the feed gas stream and/or oxygen originating from an outside source. This catalytic oxidation unit 3 makes it possible to obtain a CO concentration of the order of 100 ppm. Thus recovered at the outlet of the catalytic oxidation unit is a gas stream that is depleted in CO and slightly enriched in $CO_2$, at a pressure between 5 and 50 bar. This $CO_2$-enriched stream is then cooled to a temperature of between −40° C. and 25° C. partly by virtue of the heat exchanger 6 and of a coolant 4. The stream thus cooled is brought into contact with the membrane 7 which will make it possible to recover the $CO_2$ generated by the catalytic oxidation unit 3. Indeed, recovered at the outlet of the membrane 7 are a $CO_2$-enriched gas stream 8 and a residual gas stream 9 at a pressure of between 5 and 50 bar. This residual stream 9 is then heated to a temperature of between 90° C. and 200° C. by virtue of the heat exchanger 6. Indeed, a portion of the heat from the stream leaving the catalytic oxidation unit makes it possible to heat, by means of the heat exchanger, the residual stream 9. This operation makes it possible in fact, by means of the heat exchanger, to simultaneously cool the gas stream leaving the catalytic oxidation unit. In this configuration, the temperature of the gas at the outlet of the catalytic oxidation unit will be between 140° C. and 150° C. for CO contents of between 600 and 800 ppm at the inlet of the first separator pot and an inlet temperature of the catalytic oxidation unit of between 125° C. and 145° C. The residual stream 9 thus heated is sent to the turbines 5 in order to recover the pressure energy from the gas stream.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A process for purifying a feed gas stream comprising CO and at least 45% $CO_2$, the process comprising the steps of:
    a') providing a purification plant comprising:
        (i) a first compressor configured to compress the gas stream;
        (ii) a heat exchanger configured to cool the compressed gas stream;
        (iii) a separator pot configured to separate an overhead gas produced in the heat exchanger;
        (iv) a heater placed in a line of the overhead gas resulting from the separator pot;
        (v) a catalytic oxidation unit configured to oxidize the compressed CO in the gas stream resulting from the heater; and
        (vi) turbines disposed downstream of the catalytic oxidation unit,
    wherein said plant further comprises a membrane separation unit configured to recover the $CO_2$ produced by the catalytic oxidation unit and the separator pot, wherein the turbines are disposed in the line of a residual gas resulting from the membrane separation unit,
    wherein said plant further comprises a second heat exchanger configured to use the heat at the outlet of the catalytic oxidation unit to preheat the gas stream entering the catalytic oxidation unit, thereby cooling the gas stream leaving the catalytic oxidation unit,
    wherein said plant further comprises a second heater between the membrane and the turbines
    a) separating the feed gas stream in at least one separator pot;
    b) heating the overhead gas resulting from the separator pot within the heater to a temperature within the range of 90° C. to 140° C.;
    c) catalytically oxidizing the gas stream heated in step b) in the presence of oxygen at a temperature between 90° C. and 200° C.;
    d) recovering the energy linked to the pressure and to the temperature of the gas stream recovered downstream of the catalytic oxidation unit using the turbines, wherein the temperature of the gas stream recovered is between 50° C. to 200° C. prior to expansion in the turbines.

2. The purification process as claimed in claim 1, wherein said process further comprises, between the steps c) and d), a step of recovering the $CO_2$ produced in the catalytic oxidation step c2) by means of the membrane separation unit at a temperature between 25° C. and −50° C.

3. The process as claimed in claim 1, wherein the feed gas stream comprises oxygen and this oxygen is used in the catalytic oxidation step c).

4. The process as claimed in claim 1, wherein the concentration of CO in said feed gas stream is less than 1%.

5. The process as claimed in claim 1, wherein the concentration of CO in said feed gas stream is less than 0.1%.

6. The process as claimed in claim 1, wherein the concentration of $CO_2$ in said feed gas stream is greater than 70%.

7. The process as claimed in claim 1, wherein the catalytic oxidation step c) is carried out at a pressure of between 5 and 50 bar.

8. The process as claimed in claim 1, wherein the feed gas stream is a stream of oxy-fuel combustion flue gases.

* * * * *